United States Patent
Imanari et al.

(10) Patent No.: US 7,528,537 B2
(45) Date of Patent: May 5, 2009

(54) PHOSPHOR, PHOSPHOR PASTE, AND VACUUM ULTRAVIOLET EXCITED LIGHT-EMITTING DEVICE

(75) Inventors: Yuichiro Imanari, Tsukuba (JP); Susumu Miyazaki, Toride (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 510 days.

(21) Appl. No.: 10/581,973

(22) PCT Filed: Dec. 15, 2004

(86) PCT No.: PCT/JP2004/019149

§ 371 (c)(1), (2), (4) Date: Jun. 7, 2006

(87) PCT Pub. No.: WO2005/063921

PCT Pub. Date: Jul. 14, 2005

(65) Prior Publication Data

US 2007/0114496 A1    May 24, 2007

(30) Foreign Application Priority Data

Dec. 25, 2003 (JP) ............... 2003-429398
Dec. 25, 2003 (JP) ............... 2003-429399

(51) Int. Cl.
*H01J 1/62* (2006.01)
*H01J 63/04* (2006.01)

(52) U.S. Cl. ............ 313/495; 313/496; 313/483; 313/486; 252/301.4 R; 252/301.4 F; 252/301.36

(58) Field of Classification Search ............ 313/483, 313/486, 495, 496, 503; 257/301.4 F, 301.6 F, 257/301.4 R, 301.36
See application file for complete search history.

(56) References Cited

U.S. PATENT DOCUMENTS 6,676,853 B1   1/2004  Ueda et al.
6,960,310 B2  11/2005  Imanari et al.
2001/0054869 A1 * 12/2001  Ono et al. ............... 313/582
2002/0088963 A1 *  7/2002  Ono et al. ............ 252/301.4 R
2004/0084656 A1 *  5/2004  Imanari et al. ...... 252/301.4 R

FOREIGN PATENT DOCUMENTS

| JP | 6-145659 A | 5/1994 |
| JP | 10-1666 A | 1/1998 |
| JP | 2003-96448 A | 4/2003 |
| JP | 2003-303553 A | 10/2003 |
| JP | 2003-336047 A | 11/2003 |
| JP | 2003-342566 A | 12/2003 |
| JP | 2005-5249 A | 1/2005 |

* cited by examiner

*Primary Examiner*—Joseph L Williams
*Assistant Examiner*—Kevin Quarterman
(74) *Attorney, Agent, or Firm*—Sughrue Mion, PLLC

(57) ABSTRACT

A phosphor having small reduction in brightness when exposed to the plasma, a phosphor paste comprising the phosphor are provided. The phosphor comprises the following fluorescent substances I and II, wherein the fluorescent substance I contains silicate and Mn as an activator and the fluorescent substance II contains a compound represented by the formula (1) or a compound represented by the formula (2) and Tb as the activator.

$$(M^1_{1-a}M^2_a)(Mg_{1-b-c}Zn_b)Al_{11-d}Mn_{c+d}O_{19-(a+d)/2} \quad (1)$$

[In the formula (1), $M^1$ is at least one selected from the group consisting of La, Y and Gd, $M^2$ is at least one selected from the group consisting of Ca, Sr and Ba, a is not less than 0 and not more than 0.6, b is not less than 0 and not more than 1, c is not less than 0 and not more than 0.5, d is not less than 0 and not more than 0.5, b+c is not more than 1 and c+d is more than 0 and not more than 0.5.]

$$M^3_2O_3 \cdot mAl_2O_3 \cdot nB_2O_3 \quad (2)$$

[In the formula (2), $M^3$ is at least one selected from the group consisting of La, Y and Gd, m is not less than 2.5 and not more than 4.5 and n is not less than 3.5 and not more than 5.5.]

14 Claims, No Drawings

PHOSPHOR, PHOSPHOR PASTE, AND VACUUM ULTRAVIOLET EXCITED LIGHT-EMITTING DEVICE

TECHNICAL FIELD

The present invention relates to a phosphor, a phosphor paste and a vacuum ultraviolet excited light-emitting device.

BACKGROUND ART

A phosphor is essential for a vacuum ultraviolet excited light-emitting device such as plasma display panel (PDP) and rare gas lamp. Various phosphors have been developed. For instance, as the phosphor which is excited by irradiating with a vacuum ultraviolet to emit green light, aluminate represented by $BaAl_{12}O_{19}$:Mn and silicate represented by $Zn_2SiO_4$:Mn are known and these phosphors are widely used.

The vacuum ultraviolet excited light-emitting device includes, for instance, a front plate; a rear plate; a barrier rib between the front plate and the rear plate, which is contacted to each plate; an electrode generating electric discharge in spaces surrounded by the front plate, the rear plate and the barrier rib; a phosphor layer formed on the inside surface of the barrier rib, the front plate or the rear plate, further, a rare gas charged in the spaces. In the vacuum ultraviolet excited light-emitting device, plasma is generated through the electric discharge in the spaces filled with the rare gas to emit vacuum ultraviolet, and then the phosphor layer is excited by irradiation with the vacuum ultraviolet to emit visible light (for instance, green light).

In such a vacuum ultraviolet excited light-emitting device, since the phosphor is exposed to the plasma, there has been desired the phosphor having small reduction in brightness when exposed to the plasma.

DISCLOSURE OF THE INVENTION

An object of the present invention is to provide a phosphor having a sufficient brightness and small reduction in brightness when exposed to plasma. The other object of the invention is to provide a phosphor paste and a vacuum ultraviolet excited light-emitting device containing the phosphor.

The present inventors have studied to solve the above problems and finally completed the invention.

In other words, the present invention provides a phosphor comprising the following fluorescent substances I and II. The fluorescent substance I contains silicate and Mn as an activator and the fluorescent substance II contains at least one selected from a compound represented by the formula (1) and a compound represented by the formula (2), and Tb as the activator.

$$(M^1{}_{1-a}M^2{}_a)(Mg_{1-b-c}Zn_b)Al_{11-d}Mn_{c+d}O_{19-(a+d)/2} \quad (1)$$

[In the formula (1), $M^1$ is at least one selected from the group consisting of La, Y and Gd,
$M^2$ is at least one selected from the group consisting of Ca, Sr and Ba,
a is not less than 0 and not more than 0.6,
b is not less than 0 and not more than 1,
c is not less than 0 and not more than 0.5,
d is not less than 0 and not more than 0.5,
b+c is not more than 1, and
c+d is more than 0 and not more than 0.5.]

$$M^3{}_2O_3 \cdot mAl_2O_3 \cdot nB_2O_3 \quad (2)$$

[In the formula (2), $M^3$ is at least one selected from the group consisting of La, Y and Gd,
m is not less than 2.5 and not more than 4.5 and
n is not less than 3.5 and not more than 5.5.]

Further, the present invention provides a phosphor paste comprising the above phosphor, a solvent and a binder.

Furthermore, the present invention provides a vacuum ultraviolet excited light-emitting device comprising the above phosphor and an electrode.

MODE OF CARRYING OUT THE INVENTION

A phosphor of the present invention contains the above fluorescent substance I.

The fluorescent substance I contains silicate and Mn as an activator, and preferably is represented by the formula (3).

$$Zn_{2-e}Mn_eSiO_4 \quad (3)$$

[In the formula (3), e is more than 0, preferably not less than 0.001 and not more than 0.3, preferably not more than 0.2.]

The phosphor of the present invention further contains the fluorescent substance II.

One of the fluorescent substance II is the compound represented by the formula (1), preferably c+d is not less than 0.001 and not more than 0.2 in the formula (1). The fluorescent substance II is also preferably the compound where d is 0 in the formula (1), i.e. the fluorescent substance II is represented by the formula (4), $$(M^1{}_{1-a}M^2{}_a)(Mg_{1-b-c}Zn_bMn_c)Al_{11}O_{19-(a/2)} \quad (4)$$

[In the formula (4), $M^1$ is at least one selected from the group consisting of La, Y and Gd,
$M^2$ is at least one selected from the group consisting of Ca, Sr and Ba,
a is not less than 0 and not more than 0.6,
b is not less than 0 and not more than 1,
c is not less than 0 and not more than 0.5 and
b+c is not more than 1.]

More preferably, the fluorescent substance II is the compound where $M^1$ is La, $M^2$ is Ba and a is 0.4 in the formula (4), i.e. the fluorescent substance II is represented by the formula (5).

$$(La_{0.6}Ba_{0.4})(Mg_{1-b-c}Zn_bMn_c)Al_{11}O_{18.8} \quad (5)$$

[In the formula (5), b is not less than 0 and not more than 1,
c is not less than 0 and not more than 0.5, and
b+c is not more than 1.]

Another fluorescent substance II contains the compound represented by the formula (2) and Tb as the activator, preferably it is the compound where m is 3, n is 4 in the formula (2), i.e. the fluorescent substance II is represented by the formula (6), $$(M^3{}_{1-f}Tb_f)Al_3(BO_3)_4 \quad (6)$$

[In the formula (6), $M^3$ is at least one selected from the group consisting of La, Y and Gd, and
f is more than 0 and not more than 0.6.]

More preferably, the fluorescent substance II is the compound where $M^3$ is Y and Gd in the formula (6), i.e. the fluorescent substance II is represented by the formula (7).

$$(Y_{1-f-g}Gd_gTb_f)Al_3(BO_3)_4 \quad (7)$$

[In the formula (7), f is more than 0, preferably not less than 0.001 and not more than 0.6, preferably not more than 0.3 and
g is not less than 0, preferably not less than 0.1 and not more than 1, preferably not more than 0.5.]

In the present invention, a ratio of the fluorescent substance I and the fluorescent substance II is expressed in weight ratio where the total weight of the fluorescent substance I and the fluorescent substance II is set at 100%, the former is not less than 5% by weight, preferably not less than 20% by weight, more preferably not less than 40% by weight, and the latter is not more than 95% by weight, preferably 80% by weight, more preferably 60% by weight.

The phosphor of the present invention contains the fluorescent substance I and the fluorescent substance II, preferably does not contain any substance other than the above substances, however, the phosphor may contain some compounds other than the above substances only to the extent not to impair the effect of the invention.

The phosphor of the present invention is excited with a vacuum ultraviolet, ultraviolet (such as near ultraviolet) other than the vacuum ultraviolet, X-ray, electron beam to emit green light, and is used for PDP, rare gas lamp, fluorescent light, luminous indicator light, X-ray inspection apparatus or CRT. In particular, the phosphor has a high brightness when irradiated with the vacuum ultraviolet after exposed to plasma, therefore, the phosphor is preferably used for the vacuum ultraviolet excited light-emitting device such as PDP and rare gas lamp.

Further, the phosphor of the present invention emits green light with high chromatic purity. The chromatic purity is expressed as a chromaticity coordinate (x, y). The phosphor has x of usually not less than 0.01, preferably not less than 0.184, more preferably not less than 0.19 and usually not more than 0.35, preferably not more than 0.32, more preferably not more than 0.30, and y of usually not less than 0.60, preferably not less than 0.61, more preferably not less than 0.65 and usually not more than 0.82, preferably not more than 0.735, more preferably not more than 0.72.

The phosphor of the present invention may be produced, for instance, by mixing the fluorescent substance I with the fluorescent substance II. Mixing may be carried out using a agitator, ball mill, V-shape mixer or triple roll.

The fluorescent substance I may be prepared by calcining a mixture being converted to the fluorescent substance I by calcination, which contains metal compounds such as silicon compound, manganese compound and zinc compound. The metal compound are substances with high purity (not less than 99%) such as hydroxides, carbonates, nitrates, halides and oxalates, which are converted into oxides by decomposition at high temperature such as the calcination temperature described below, or an oxide with high purity (not less than 99%). Examples of the metal compounds include silicon dioxide, manganese carbonate, zinc oxide with a high purity. Mixing of the metal compounds may be carried out using a ball mill, V-shape mixer or agitator. When the compounds such as hydroxides, carbonates, nitrates, halides and oxalates are used as a raw material, which are converted to oxides by decomposition at high temperature, the compounds may be pre-calcined before calcination. Pre-calcination may be carried out under the conditions of removing water (adsorbed water) or crystal water from the compounds to be converted to oxides, for instance, under the conditions of temperature of not less than 600° C. and less than 900° C. The pre-calcination may be carried out under any of oxidative atmosphere (for instance, in air) and reductive atmosphere.

Calcination may be carried out under oxygen atmosphere; under oxidative atmosphere containing oxygen, nitrogen and argon (for instance, in air), preferably in air. Calcination may be carried out usually under the conditions of temperature of not less than 1000° C. and not more than 1500° C. and of time period of not less than 1 hour and not more than 100 hours. In the calcination, the mixture before calcination may be added with flux, followed by calcining this mixture.

The fluorescent substance I obtained by calcination may be subjected to treatment such as pulverizing, washing and classification. The pulverizing may be carried out using a ball mill, jet mill. Further, the fluorescent substance I or the treated fluorescent substance I may be calcined again. The additional calcination provides the fluorescent substance I with high crystallinity.

The fluorescent substance II may be prepared by calcining a mixture being converted to the fluorescent substance II by calcination, which contains compounds such as lanthanum compound, yttrium compound, gadolinium compound, calcium compound, strontium compound, barium compound, magnesium compound, zinc compound, aluminum compound, manganese compound, terbium compound and boron compound. The compounds are substances with high purity (not less than 99%) such as hydroxides, carbonates, nitrates, halides and oxalates, which are converted to the oxides by decomposition at high temperature such as the calcination temperature described below, or are oxides with high purity (not less than 99%). Examples of the compounds include lanthanum oxide, yttrium oxide, gadolinium oxide, barium carbonate, basic magnesium carbonate, zinc oxide, aluminum hydroxide, manganese carbonate, terbium oxide boric acid. Mixing may be carried out using a ball mill, V-shape mixer, agitator, just like the fluorescent substance I. When the compounds such as hydroxides, carbonates, nitrates, halides and oxalates, which are converted to the oxides by decomposition at high temperature, are used as a raw material, the compounds may be pre-calcined before calcination. Pre-calcination may be carried out under the conditions of removing water (adsorbed water) or crystal water from the compounds to be converted to the oxides, for instance, under the conditions of temperature of not less than 600° C. and less than 900° C. The pre-calcination may also be carried out under any of air atmosphere and reductive atmosphere.

Calcination is preferably carried out under reductive atmosphere such as inert gases (for instance, argon, nitrogen) containing hydrogen of 0.1 to 10% by volume. The calcination temperature is usually not less than 1000° C. and not more than 1500° C. and the time period is not less than 1 hour and not more than 100 hours. Also in the calcination, the mixture before calcination may be added with flux, followed by calcining the resultant mixture.

The fluorescent substance II obtained by calcination may be subjected to treatment such as grinding, washing, and classification. The grinding may be carried out using a ball mill or a jet mill. Further, the fluorescent substance II or the treated fluorescent substance II may be calcined again. The additional calcination provides the fluorescent substance II with high crystallinity.

A phosphor paste of the present invention contains the above phosphor, a solvent and a binder.

The solvent may be a substance which, when mixing the phosphor and the binder, forms this mixture in form of paste. Examples of the solvent include monohydroxy alcohols with high boiling point (for instance, higher alcohol); polyhydric alcohols such as diol and triol represented by ethylene glycol and glycerin; and a compound obtained by etherifying and/or esterifying alcohol (ethylene glycol monoalkyl ether, ethylene glycol dialkyl ether, ethylene glycol alkyl ether acetate, diethylene glycol monoalkyl ether acetate, diethylene glycol dialkyl ether, propylene glycol monoalkyl ether, propylene glycol dialkyl ether, and propylene glycol alkyl acetate). The amount of the solvent is usually not less than 50 parts by weight and not more than 500 parts by weight based on 100 parts by weight of the phosphor.

The binder may be a compound which is able to fix the phosphor to a substrate, when containing the resultant phosphor paste to the substrate to form a phosphor layer. Examples of the binder include cellulosic resin (ethyl cellulose, methyl cellulose, cellulose nitrate, cellulose acetate, cellulose propionate, hydroxypropyl cellulose, butyl cellulose, benzyl cellulose, modified cellulose); acrylic resin (polymer of at least one monomer selected from the group consisting of acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, benzyl acrylate, benzyl methacrylate, phenoxy acrylate, phenoxy methacrylate, isobornyl acrylate, isobornyl methacrylate, glycidyl methacrylate, styrene, a-methylstyrene acrylamide, meta-acrylamide, acrylonitrile, meta-acrylonitrile); ethylene-vinyl acetate copolymer; polyvinyl butyral, polyvinyl alcohol, propylene glycol, urethane resin, melamine resin, phenol resin. The amount of the binder is usually not less than 10 parts by weight and not more than 50 parts by weight based on 100 parts by weight of the phosphor.

According to the phosphor paste of the present invention, the phosphor layer is easily formed on the substrate or the barrier rib. The resultant phosphor layer has high brightness and small reduction in brightness even when being subjected to a plasma exposure and a thermal treatment. Therefore, the phosphor paste of the present invention is useful to form the phosphor layer used in a vacuum ultraviolet excited light-emitting device such as PDP and rare gas lamp. In production of the PDP, for instance, the phosphor paste is applied to a light-emitting portion, and the light-emitting portion is heat-treated to remove the binder, to form the phosphor layer. The phosphor paste of the present invention may be prepared by mixing the fluorescent substance I, the fluorescent substance II, a solvent and a binder using a ball mill or triple roll. Mixing may be carried out, for instance, under the conditions of temperature of not less than 10° C. and not more than 80° C. and time period of not less than 10 minutes and not more than 5 hours.

The vacuum ultraviolet excited light-emitting device of the present invention contains the phosphor described above, and usually contains an electrode other than the phosphor. Examples of the vacuum ultraviolet excited light-emitting device include PDP and rare gas lamp. The PDP contains a rear plate, a phosphor layer, a transparent electrode, a bus electrode, a dielectric layer and a front plate. The PDP may be produced, for instance, by a method disclosed in JP-A-10-195428. A method for producing the PDP includes the steps of (a)-(c).

(a) applying a blue light-emitting phosphor paste, a red light-emitting phosphor paste and the green light-emitting phosphor paste of the present invention, respectively, (by a screen printing) to surface of a barrier rib and surface of a substrate which is the inner surface of the rear plate and which is partitioned with the barrier rib, is provided with an address electrode, and is in the form of stripe, followed by calcination in the temperature range of about 300° C. to about 600° C. to form the phosphor layer;

(b) contacting the resultant phosphor layer with a surface glass substrate provided with the transparent electrode and the bus electrode in a direction perpendicular to the phosphor layer and provided with the dielectric layer and a protection layer on the inner surface; and binding them, (c) enclosing a space surrounded by the rear plate and the surface glass substrate, which is evacuated of air and filled with a rare gas (for instance, Xe, Ne), to form a discharge space.

The rare gas lamp may also be produced by a method similar to a conventional method, except that the above phosphor paste is used as a raw material.

EXAMPLES

The following examples will illustrate the present invention more in detail, but do not limit the scope of the invention.

Brightness of Phosphor Before Treatment:

A phosphor was put into a vacuum chamber and was irradiated with a vacuum ultraviolet using an excimer 146 nm lamp (H0012 type manufactured by Ushio Electric Inc.) under not more than 6.7 Pa ($5 \times 10^{-2}$ torr) to measure the brightness of the phosphor.

Brightness and Chromaticity Coordinate of Phosphor After Treatment:

The phosphor was heat-treated under the conditions of; atmosphere: air, temperature: 500° C., holding time: 30 minutes and heat-treated under the conditions of atmosphere: Xe of 5% by volume and Ne of 95% by volume, pressure: 13.2 Pa, temperature: 500° C., holding time: 30 minutes. The resultant phosphor was put into a vacuum chamber and was exposed to plasma of 50 W for 15 minutes. Thereafter the brightness of the phosphor was measured. The chromaticity coordinate (x, y) was measured using a color brightness photometer (BM-7 manufactured by Topcon Corporation.)

Production Example 1

Production of Fluorescent Substance I

Zinc oxide (purity of 99.9%; manufactured by Kyowa Chemical Industry Co., Ltd.), manganese carbonate (purity of 99.9%; manufactured by Wako Pure Chemical Industries, Ltd.), and silicon dioxide (purity of 99.99%; manufactured by Japan Aerosil Co., Ltd.) were weighed to Zn:Mn:Si=1.9:0.1:1.0 (in molar ratio), and then mixed with a solvent (isopropyl alcohol) with a wet ball mill for 4 hours to obtain slurry. The solvent in the slurry was removed with an evaporator, and then the resultant dry powder was put into an alumina crucible, subsequently calcined under air atmosphere at 1200° C. for 2 hours, thereafter slowly cooled down to room temperature to obtain the fluorescent substance I represented by $Zn_{1.9}Mn_{0.1}SiO_4$. The brightness of the fluorescent substance I was measured. The fluorescent substance I emitted green light when irradiated with a vacuum ultraviolet of wavelength of 146 nm. The brightness of this case was set at 100. For the fluorescent substance I, the brightness and the chromaticity coordinate after treatment were measured. The results were shown in Table 1.

Production Example 2

Production of Fluorescent Substance IIa

Lanthanum oxide (purity of 99.99%; manufactured by Shin-Etsu Chemical Co., Ltd.), barium carbonate (purity of 99.9%; manufactured by Wako Pure Chemical Industries, Ltd.), basic magnesium carbonate (purity of not less than 99%; manufactured by Kyowa Chemical Industry Co., Ltd.), zinc oxide (purity of 99.9%; manufactured by Kyowa Chemical Industry Co., Ltd.), aluminum hydroxide (purity of not less than 99%; manufactured by Sumitomo Chemical Co., Ltd.), and manganese carbonate (purity of 99.9%; manufactured by Wako Pure Chemical Industries, Ltd.) were weighed to La:Ba:Mg:Zn:Al:Mn=0.6:0.4:0.65:0.3:11.0:0.05 (in molar ratio), and then mixed with isopropyl alcohol with a wet ball mill for 4 hours to obtain slurry. The solvent in the slurry was removed with an evaporator, and then the resultant dry powder was put into an alumina crucible, subsequently calcined under air atmosphere at 1550° C. for 24 hours, thereafter slowly cooled down to room temperature. The calcined powder was put into an alumina boat, and then calcined again under reductive atmosphere (mixed gas containing hydrogen of 2% by volume and nitrogen of the balance), at 1400° C. for 2 hours, thereafter slowly cooled down to room temperature to obtain the fluorescent substance IIa represented by $La_{0.6}Ba_{0.4}(Mg_{0.65}Zn_{0.3}Mn_{0.05})Al_{11}O_{18.8}$. The fluorescent substance IIa emitted green light when irradiated with a vacuum ultraviolet of wavelength of 146 nm. The brightnesses before and after treatment and the chromaticity coordinate were shown in Table 1.

Production Example 3

Production of Fluorescent Substance IIb

Yttrium oxide (purity of 99.99%; manufactured by Shin-Etsu Chemical Co., Ltd.), gadolinium oxide (purity of 99.99%; manufactured by Shin-Etsu Chemical Co., Ltd.), terbium oxide (purity of 99.99%; manufactured by Shin-Etsu Chemical Co., Ltd.), aluminum hydroxide (purity of not less than 99%; manufactured by Sumitomo Chemical Co., Ltd.), and boric acid (purity of not less than 99%; manufactured by Wako Pure Chemical Industries, Ltd.) were weighed to Y:Gd:Tb:Al:B=0.385:0.315:0.3:3.0:4.0 (in molar ratio), and then mixed with a dry ball mill for 4 hours to obtain powder. The resultant powder was put into an aluminum bottle, subsequently calcined in the air atmosphere at 1150° C. for 20 hours, thereafter slowly cooled down to room temperature to obtain the fluorescent substance IIb represented by $Y_{0.385}Gd_{0.315}Tb_{0.3}Al_3(BO_3)_4$. The fluorescent substance IIb emitted green light when irradiated with a vacuum ultraviolet of wavelength of 146 nm. The brightnesses before and after treatment and the chromaticity coordinate are shown in Table 2.

Examples 1 to 7

The fluorescent substance I and the fluorescent substance IIa were weighed to 5/95, 20/80, 40/60, 50/50, 60/40, 80/20, and 95/5 (in weight ratio), and then wet-mixed with ethanol, subsequently dried to obtain phosphors. For the resultant phosphors, the brightnesses before and after treatment and the chromaticity coordinate were shown in Table 1.

TABLE 1

| | Weight ratio (% by weight) | | Relative brightness | | |
|---|---|---|---|---|---|
| | Fluorescent substance I | Fluorescent substance IIa | Before treatment | After treatment | Chromaticity coordinate (x, y) |
| Production example 1 | 100 | 0 | 100 | 56 | (0.256, 0.706) |
| Example 1 | 95 | 5 | 98 | 61 | (0.250, 0.707) |
| Example 2 | 80 | 20 | 94 | 66 | (0.240, 0.712) |
| Example 3 | 60 | 40 | 87 | 69 | (0.231, 0.718) |
| Example 4 | 50 | 50 | 84 | 72 | (0.224, 0.721) |
| Example 5 | 40 | 60 | 82 | 68 | (0.218, 0.725) |
| Example 6 | 20 | 80 | 75 | 65 | (0.205, 0.730) |
| Example 7 | 5 | 95 | 71 | 65 | (0.184, 0.735) |
| Production example 2 | 0 | 100 | 68 | 64 | (0.180, 0.739) |

From the results of Table 1, the phosphors obtained in the examples 1 to 7 had a sufficient brightness after treatment and emitted green light with high chromatic purity.

Examples 8 to 14

The fluorescent substance I and the fluorescent substance IIb were weighed to 5/95, 20/80, 40/60, 50/50, 60/40, 80/20, and 95/5 (in weight ratio), and then wet-mixed with ethanol, subsequently dried to obtain phosphors. For the resultant phosphors, the brightnesses before and after treatment and the chromaticity coordinate were shown in Table 2.

TABLE 2

| | Weight ratio (% by weight) | | Relative brightness | | |
|---|---|---|---|---|---|
| | Fluorescent substance I | Fluorescent substance IIb | Before treatment | After treatment | Chromaticity coordinate (x, y) |
| Production example 1 | 100 | 0 | 100 | 56 | (0.256, 0.706) |
| Example 8 | 95 | 5 | 101 | 60 | (0.258, 0.700) |
| Example 9 | 80 | 20 | 101 | 71 | (0.271, 0.682) |
| Example 10 | 60 | 40 | 103 | 80 | (0.286, 0.647) |
| Example 11 | 50 | 50 | 105 | 88 | (0.298, 0.634) |
| Example 12 | 40 | 60 | 106 | 91 | (0.311, 0.621) |
| Example 13 | 20 | 80 | 105 | 98 | (0.321, 0.608) |
| Example 14 | 5 | 95 | 106 | 105 | (0.328, 0.600) |
| Production example 3 | 0 | 100 | 108 | 107 | (0.335, 0.583) |

From the results of Table 2, the phosphors obtained in the examples 8 to 14 had a sufficient brightness after treatment and emitted green light with high chromatic purity.

The invention claimed is:
1. A phosphor, comprising fluorescent substances I and II, wherein the fluorescent substance I contains silicate and Mn as an activator and the fluorescent substance II contains a compound represented by the formula (1) or a compound represented by the formula (2) and Tb as the activator:

$$(M^1{}_{1-a}M^2{}_a)(Mg_{1-b-c}Zn_b)Al_{11-d}Mn_{c+d}O_{19-(a+d)/2} \quad (1)$$

wherein, in formula (1), $M^1$ is selected from the group consisting of La, Y, Gd, and mixtures thereof,
$M^2$ is selected from the group consisting of Ca, Sr, Ba, and mixtures thereof,
a is not less than 0 and not more than 0.6,
b is not less than 0 and not more than 1,
c is not less than 0 and not more than 0.5,
d is not less than 0 and not more than 0.5,
b+c is not more than 1, and
c+d is more than 0 and not more than 0.5, $$M^3{}_2O_3 \cdot mAl_2O_3 \cdot nB_2O_3 \quad (2)$$

wherein, in formula (2), $M^3$ is selected from the group consisting of La, Y, Gd, and mixtures thereof,
m is not less than 2.5 and not more than 4.5 and
n is not less than 3.5 and not more than 5.5.

2. The phosphor according to claim 1, wherein a ratio of the fluorescent substance I by weight and the fluorescent substance II by weight is 5/95-95/5.

3. The phosphor according to claim 1 or 2, wherein the fluorescent substance I is represented by the formula (3)

$$Zn_{2-e}Mn_eSiO_4 \quad (3)$$

wherein, in formula (3), e is more than 0 and not more than 0.3.

4. The phosphor according to claim 1 or 2, wherein the fluorescent substance II is represented by the formula (4), $$(M^1{}_{1-a}M^2{}_a)(Mg_{1-b-c}Zn_bMn_c)Al_{11}O_{19-(a/2)} \quad (4)$$

wherein, in formula (4), $M^1$ is selected from the group consisting of La, Y, Gd, and mixtures thereof,
$M^2$ is selected from the group consisting of Ca, Sr, Ba, and mixtures thereof,
a is not less than 0 and not more than 0.6,
b is not less than 0 and not more than 1,
c is not less than 0 and not more than 0.5 and
b+c is not more than 1.

5. The phosphor according to claim 4, wherein the fluorescent substance II is represented by the formula (5)

$$(La_{0.6}Ba_{0.4})(Mg_{1-b-c}Zn_bMn_c)Al_{11}O_{18.8} \quad (5)$$

wherein, in formula (5), b is not less than 0 and not more than 1,
c is not less than 0 and not more than 0.5, and
b+c is not more than 1.

6. The phosphor according to claims 1 or 2, wherein the fluorescent substance II is represented by the formula (6), $$(M^3{}_{1-f}Tb_f)Al_3(BO_3)_4 \quad (6)$$

wherein, in formula (6), $M^3$ is selected from the group consisting of La, Y, Gd, mixtures thereof, and
f is more than 0 and not more than 0.6.

7. The phosphor according to claim 6, wherein the fluorescent substance II is represented by the formula (7)

$$(Y_{1-f-g}Gd_gTb_f)Al_3(BO_3)_4 \quad (7)$$

wherein, in formula (7), f is more than 0 and not more than 0.6 and g is not less than 0 and not more than 1.

8. A phosphor paste, comprising a phosphor, a solvent and a binder, wherein the phosphor comprises substances I and II, wherein the fluorescent substance I contains silicate and Mn as an activator and the fluorescent substance II contains a compound represented by the formula (1) or a compound represented by the formula (2) and Tb as the activator:

$$(M^1{}_{1-a}M^2{}_a)(Mg_{1-b-c}Zn_b)Al_{11-d}Mn_{c+d}O_{19-(a+d)/2} \quad (1)$$

wherein, in formula (1), $M^1$ is selected from the group consisting of La, Y, Gd, and mixtures thereof,
$M^2$ is selected from the group consisting of Ca, Sr, Ba, and mixtures thereof,
a is not less than 0 and not more than 0.6,
b is not less than 0 and not more than 1,
c is not less than 0 and not more than 0.5,
d is not less than 0 and not more than 0.5,
b+c is not more than 1, and
c+d is more than 0 and not more than 0.5, $$M^3{}_2O_3 \cdot mAl_2O_3 \cdot nB_2O_3 \quad (2)$$

wherein, in formula (2), $M^3$ is selected from the group consisting of La, Y, Gd, and mixtures thereof,
m is not less than 2.5 and not more than 4.5 and
n is not less than 3.5 and not more than 5.5.

9. A vacuum ultraviolet excited light-emitting device comprising a phosphor and an electrode, wherein the phosphor comprises substances I and II, wherein the fluorescent substance I contains silicate and Mn as an activator and the fluorescent substance II contains a compound represented by the formula (1) or a compound represented by the formula (2) and Tb as the activator:

$$(M^1{}_{1-a}M^2{}_a)(Mg_{1-b-c}Zn_b)Al_{11-d}Mn_{c+d}O_{19-(a+d)/2} \quad (1)$$

wherein, in formula (1), $M^1$ is selected from the group consisting of La, Y, Gd, and mixtures thereof,
$M^2$ is selected from the group consisting of Ca, Sr, Ba, and mixtures thereof,
a is not less than 0 and not more than 0.6,
b is not less than 0 and not more than 1,
c is not less than 0 and not more than 0.5,
d is not less than 0 and not more than 0.5,
b+c is not more than 1, and
c+d is more than 0 and not more than 0.5, $$M^3{}_2O_3 \cdot mAl_2O_3 \cdot nB_2O_3 \quad (2)$$

wherein, in formula (2), $M^3$ is selected from the group consisting of La, Y, Gd, and mixtures thereof,
m is not less than 2.5 and not more than 4.5 and
n is not less than 3.5 and not more than 5.5.

10. The phosphor according to claim 3, wherein e is not less than 0.001 and not more than 0.2.

11. The phosphor according to claim 3, wherein the fluorescent substance II is represented by the formula (4), $$(M^1{}_{1-a}M^2{}_a)(Mg_{1-b-c}Zn_bMn_c)Al_{11}O_{19-(a/2)} \quad (4)$$

wherein, in formula (4), $M^1$ is selected from the group consisting of La, Y, Gd, and mixtures thereof,
$M^2$ is selected from the group consisting of Ca, Sr, Ba, and mixtures thereof,
a is not less than 0 and not more than 0.6,
b is not less than 0 and not more than 1,
c is not less than 0 and not more than 0.5 and
b+c is not more than 1.

12. The phosphor according to claim 11, wherein the fluorescent substance II is represented by the formula (5)

$$(La_{0.6}Ba_{0.4})(Mg_{1-b-c}Zn_bMn_c)Al_{11}O_{18.8} \quad (5)$$

wherein, in formula (5), b is not less than 0 and not more than 1,
c is not less than 0 and not more than 0.5, and
b+c is not more than 1.

13. The phosphor according to claim 3, wherein the fluorescent substance II is represented by the formula (6), $$(M^3_{1-f}Tb_f)Al_3(BO_3)_4 \tag{6}$$

wherein, in formula (6), $M^3$ is selected from the group consisting of La, Y, Gd, mixtures thereof, and f is more than 0 and not more than 0.6.

14. The phosphor according to claim 13, wherein the fluorescent substance II is represented by the formula (7)

$$(Y_{1-f-g}Gd_gTb_f)Al_3(BO_3)_4 \tag{7}$$

wherein, in formula (7), f is more than 0 and not more than 0.6 and g is not less than 0 and not more than 1.

* * * * *